US007211764B2

(12) United States Patent
Leisner et al.

(10) Patent No.: US 7,211,764 B2
(45) Date of Patent: May 1, 2007

(54) ENGINE DRIVEN WELDER/GENERATOR WITH HIGH POWER ACCESSORY OUTPUT OPERABLE AT LOWER ENGINE SPEEDS

(75) Inventors: John C. Leisner, Appleton, WI (US); Daniel C. Fosbinder, Appleton, WI (US); Randy Du Val, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 387 days.

(21) Appl. No.: 10/709,834

(22) Filed: Jun. 1, 2004

(65) Prior Publication Data

US 2005/0263513 A1  Dec. 1, 2005

(51) Int. Cl.
*B23K 9/10* (2006.01)

(52) U.S. Cl. ...................................... 219/133
(58) Field of Classification Search ................ 219/133; 290/1 A, 1 R; 310/89; 322/90
See application file for complete search history.

(56) References Cited

U.S. PATENT DOCUMENTS

| 2,898,542 | A | * | 8/1959 | Wasko et al. ................. 322/90 |
| 4,465,920 | A | * | 8/1984 | Hoyt et al. .................. 219/133 |
| 5,606,244 | A | * | 2/1997 | Migdal ........................ 322/90 |
| 5,936,320 | A | * | 8/1999 | Takeda et al. ................ 310/89 |
| 6,118,186 | A | * | 9/2000 | Scott et al. .................. 290/1 A |
| 6,674,179 | B2 | * | 1/2004 | Beeson et al. .............. 290/1 A |
| 6,975,042 | B2 | * | 12/2005 | Yamada et al. ............. 290/1 R |

FOREIGN PATENT DOCUMENTS

AT          388 829 B       9/1989

* cited by examiner

*Primary Examiner*—Clifford C. Shaw
(74) *Attorney, Agent, or Firm*—Ziolkowski Patent Solutions Group, SC

(57) ABSTRACT

An engine driven welder-type device and method of powering an accessory are disclosed. The device has an engine coupled to a power converter constructed to generate an electrical power suitable for welding applications. The device also provides a relatively uniform power to an auxiliary outlet across a wide range of engine speeds.

28 Claims, 4 Drawing Sheets

ENGINE DRIVEN WELDER/GENERATOR WITH HIGH POWER ACCESSORY OUTPUT OPERABLE AT LOWER ENGINE SPEEDS

BACKGROUND OF INVENTION

The present invention relates generally to engine driven welder/generator systems and, more particularly, to an accessory output powered therefrom.

Engine driven welder/generator systems generally include an internal combustion engine configured to supply power to the device. The mechanical power generated by the engine is converted to an electrical power signal suitable for welding type applications. In addition to the welding power electrical outputs, such devices are also often equipped with auxiliary electrical power outlets.

The auxiliary power outlets are often configured to power ancillary devices related to metal working processes such as drills, chop saws, and other hand held power tools. Additionally, due to the increased portability of engine driven welder/generator devices, such devices are often operated to power the ancillary tools or other power requiring devices unrelated to welding operations. Such devices can include compressors or pumps if such are not integral to the device. Another accessory commonly powered by the auxiliary outlets are lighting systems. Due to the increased portability of the devices, as well as the demanding schedules of the workplace, welder/generator systems can be operated deep within structures and after sunset where and when ambient light is inadequate for a workable work environment.

Regardless of what ancillary device is powered by the auxiliary outlets, and to maximize the functionality of these devices the devices can be constructed to operate a power signal that is comparable to a power grid power signal. That is, in the United States, these devices are generally constructed to be powered by an AC power signal having a frequency of approximately 60 Hz. Such a construction allows the auxiliary devices to be powered by both a conventional wall outlet attached to a power grid and portable welder/generator assemblies configured to generate a 60 Hz power signal.

Some welder/generator systems are capable of generating an auxiliary power signal of 60 Hz; however, these systems require the engine of the device be operated at near full capacity in order to maintain the power signal at the requisite 60 Hz. When such systems are merely used to power the auxiliary outlets, and not used for welding applications, these systems are considerably inefficient. That is, the mechanical power producer, i.e. the engine, produces much more power, and therefore consumes excessive energy, than is required to maintain sufficient power at the auxiliary outlets. As the engine runs at elevated operating speeds, it consumes a greater amount of fuel than when the engine is operated at a lower engine speed. Additionally, operating the engine at elevated operating speeds shortens the interval between scheduled engine maintenance thereby decreasing the in-service interval of the device.

It would therefore be desirable to have a welder/generator system and method capable of generating a relatively uniform auxiliary output power signal independent of engine operating speed.

BRIEF DESCRIPTION OF INVENTION

The present invention provides a welder/generator device and method of powering an accessory that solves the aforementioned problems. The welder/generator device has an engine connected to a power converter. The power converter is connected to the engine and is constructed to generate a power signal suitable for welding applications. The device generates a second power signal configured to power auxiliary devices independent of engine speed.

Therefore, in accordance with one aspect of the present invention, an engine driven welder-type device is disclosed that includes an engine and a mechanical to electrical power converter connected to the engine and configured to generate a power signal suitable for welding processes. The device also includes an accessory outlet having a generally uniform power output from engine idle speed through high speed operation of the engine.

According to another aspect of the present invention, an engine driven welder/generator assembly is disclosed that includes an engine and a power converter connected to the engine and configured to generate sufficient electrical power suitable for welding. The assembly includes a power conditioner configured to provide a generally uniform power signal independent of engine speed.

In accordance with a further aspect of the present invention, a method of powering an accessory is disclosed that includes the step of generating an electrical power signal from an engine driven welder/generator assembly. The method also includes the steps of generating a weld power from the electrical power signal and generating a relatively uniform auxiliary power signal across variable engine speeds.

In yet another aspect of the present invention, a welding-type apparatus is disclosed that includes an engine constructed to generate mechanical power and means for converting the mechanical power to electrical power suitable for welding applications. The apparatus includes means for providing a relatively constant power signal independent of engine operating speed.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
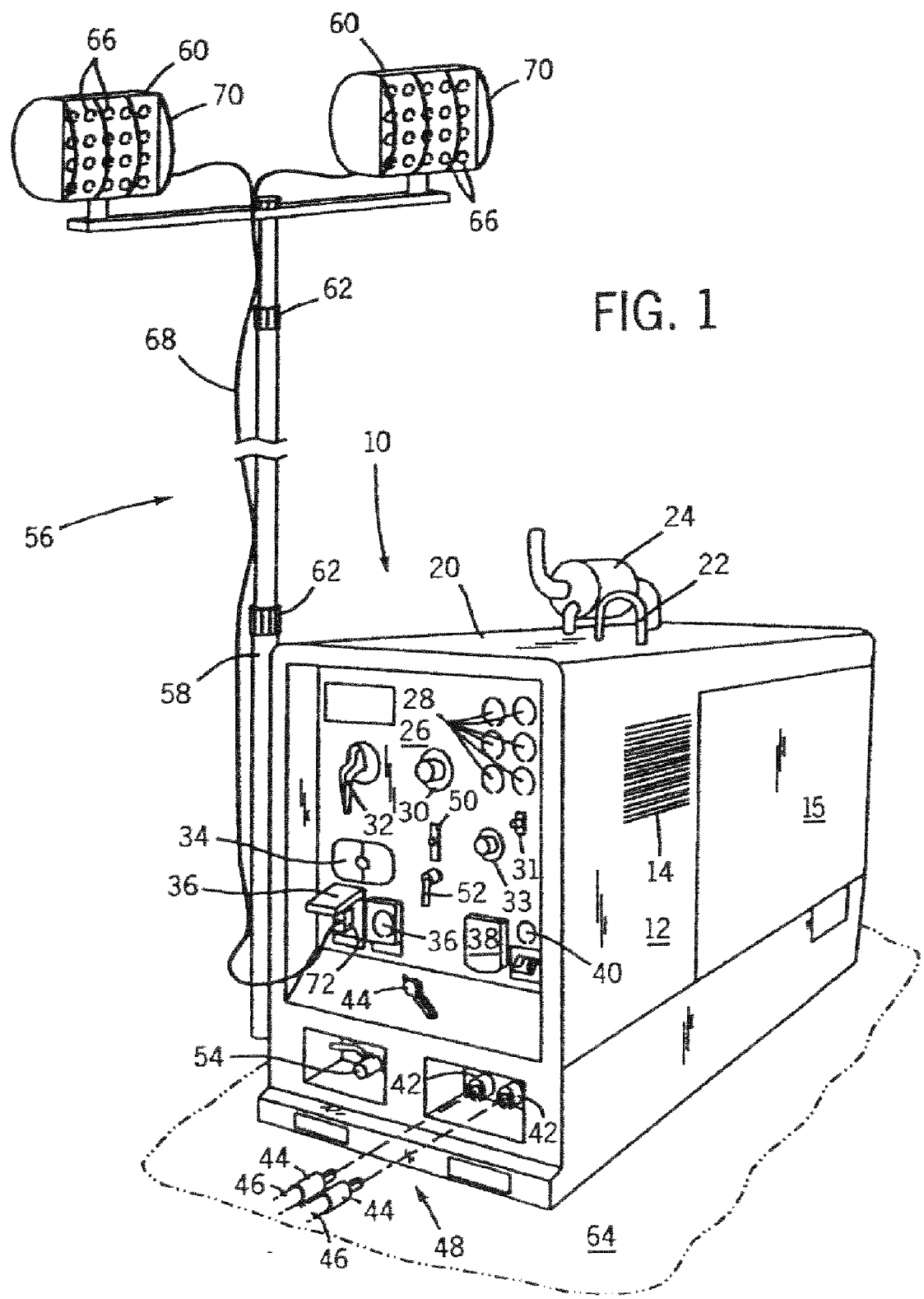
FIG. 1 is a perspective view of the welder/generator device according to the present invention.

Referring now to FIG. 1, a portable engine-driven welder/generator system 10 is provided and, for brevity, will hereinafter be referred to as a welding device 10. As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems or any similar systems.

Welding device 10 has an outer housing 12 that has one or more air vents 14 for cooling internal components of welding device 10. The housing 12 includes an access panel 15 that can be opened to permit access to the internal components of welding device 10 for maintenance and service. An upper surface 20 of welding device 10 includes a lifting hook 22 extending through housing 12 for lifting and transporting of the welding device. Also attached to the upper surface 20 is an exhaust system 24 that lowers noise and passes exhaust gas from an engine of welding device 10 through housing 12.

Welding device 10 includes a control panel 26 that has various control elements and gauges for operating the welding device 10. A plurality of gauges 28 measure various parameters of the welding device 10. Measured parameters can include fuel level, oil temperature, battery amperage, and air pressure. Control panel 26 also has a control dial 30 and an ampere range switch 32 which are used to select a voltage/amperage for welding operations. Process selector switch 34 selects the type of weld output. The weld output is determined by the type of welding process to be performed. Examples of weld processes that may be implemented include stick welding, gas metal arc welding, tungsten inert gas welding, air-carbon arc cutting, and various wire feed processes. Auxiliary outlets 36 provide power for electrically driven devices, such as saws, drills, lights, etc. Control panel 26 also includes a compressor on/off switch 31 and an engine control switch 33 to independently control the compressor and engine, respectively.

The control panel 26 also includes multiple power connections such as a single phase power connect 38, an optional three-phase power connect 40, and weld-power receptacles 42. Weld cable connectors 44 are connected to welding cables 46 and are constructed to engage weld-power receptacles 42. Weld cables 46 electrically connect a torch and a work clamp to welding device 10. Weld-power receptacles 42 and weld cable connectors 44 form a connector assembly 48 for removably connecting weld cables 46 to welding device 10. An optional polarity switch 50 can be used to select the polarity of the weld output. Typical selections include direct current electrode negative, direct current electrode positive, and alternating current. A panel remote switch 52 and remote receptacle 54 select remote control of the welding device 10 in instances where welding operations are remotely located from the welding device 10.

An example of an auxiliary device capable of being powered by auxiliary outlet 36 is a light tower 56. Light tower 56 is optionally physically attached to welding device 10. A support bracket 58 supports a plurality of lights 60 attached thereto. Support bracket 58 includes a plurality of collets 62 for extending lights 60 generally above a work area 64. Although support bracket 58 is shown as having a telescoping construction, such is merely by way of example. It is understood that support bracket 60 could be a rigid structure or have some other collapsing means such as a plurality of hinged members. Lights 60 include a plurality of illumination means 66 connected to auxiliary outlet 36 via a power cord 68. Preferably, illumination means 66 includes at least one of a plurality of LED's, a halogen bulb, and a fluorescent bulb. A guard 70 is positioned over lights 60 and prevents inadvertent damage to illumination means 66 contained therein. Additionally, guards 70 are removable or rotatable to allow replacement of illumination means 66. A plug 72 is attached to cord 68 and is constructed to electrically connect illumination means 66 with auxiliary outlet 36. It is understood that an auxiliary device to be powered by auxiliary outlet 36 could be constructed to operate with a DC or AC power signal provided at outlet 26.

Figure 2:
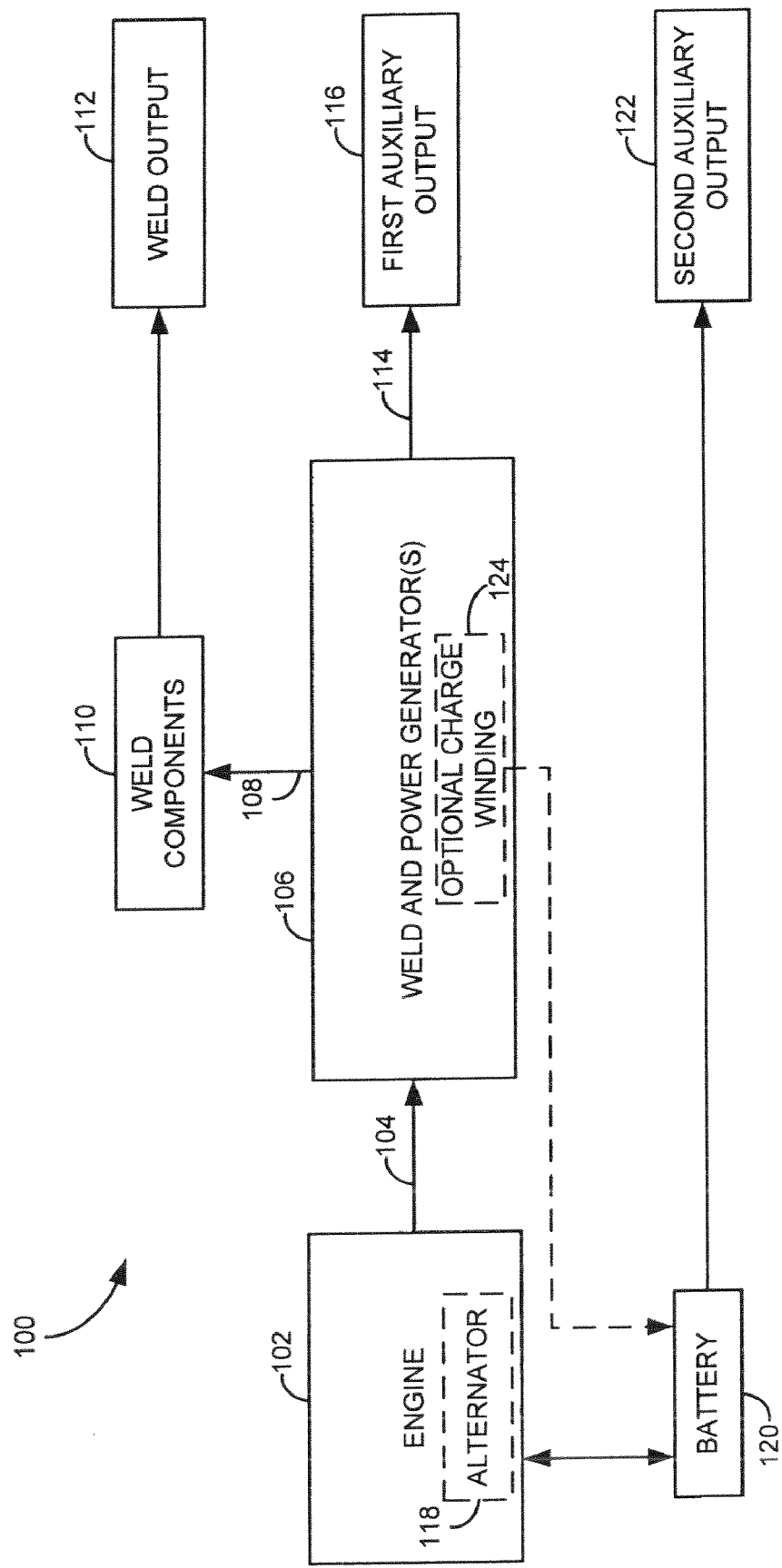
FIG. 2 is a block diagram of the major components of the welder/generator device of FIG. 1.

A schematic representation of one embodiment of a welding device 100 according to the present invention is shown in FIG. 2. Welding device 100 has an engine 102 constructed to generate a mechanical output 104. Mechanical output 104 from engine 102 is coupled to a generator 106 constructed to convert mechanical output 104 from engine 102 into an electrical power signal. A first output 108 from generator 106 is electrically connected to a plurality of welding power conditioning components 110. Weld components 110 condition first output 108 into a weld output 112 suitable for welding-type applications. A second output 114 of generator 106 is electrically connected to an optional first auxiliary output 116. First auxiliary output 116 and weld output 112 are each configured to generate an appropriate power signal for the intended use, i.e., a power signal conditioned to power auxiliary devices or a welding-type output, when engine 102 is operated above an idle operating speed.

An alternator 118 is connected to engine 102 and converts a portion of the mechanical energy generated by engine 102 into DC electrical energy. Alternator 118 is in electrical communication with a battery 120. Battery 120 facilitates starting of engine 102 and is electrically coupled to a second auxiliary output 122. Second auxiliary output 122, being powered by battery 120, provides a relatively constant uniform auxiliary power signal independent of engine speed and is configured to power auxiliary devices independent of engine operation. Alternatively, welding device 100 can include an optional charge winding 124 coupled or integrated with generator 106. Charge winding 124 is electrically connected to battery 120 and configured to charge battery 120 similar to alternator 118. Regardless of whether alternator 118, charge winding 124, or both are incorporated into welding device 100, battery 120 is constructed to provide a relatively uniform and constant power signal to second auxiliary output 122 independent of engine operation. Second auxiliary output 122 is configured to power any of a plurality of ancillary devices connectable thereto. Such a welding device allows powering of auxiliary devices such as tools or lights independent of engine operation and speed.

Figure 3:
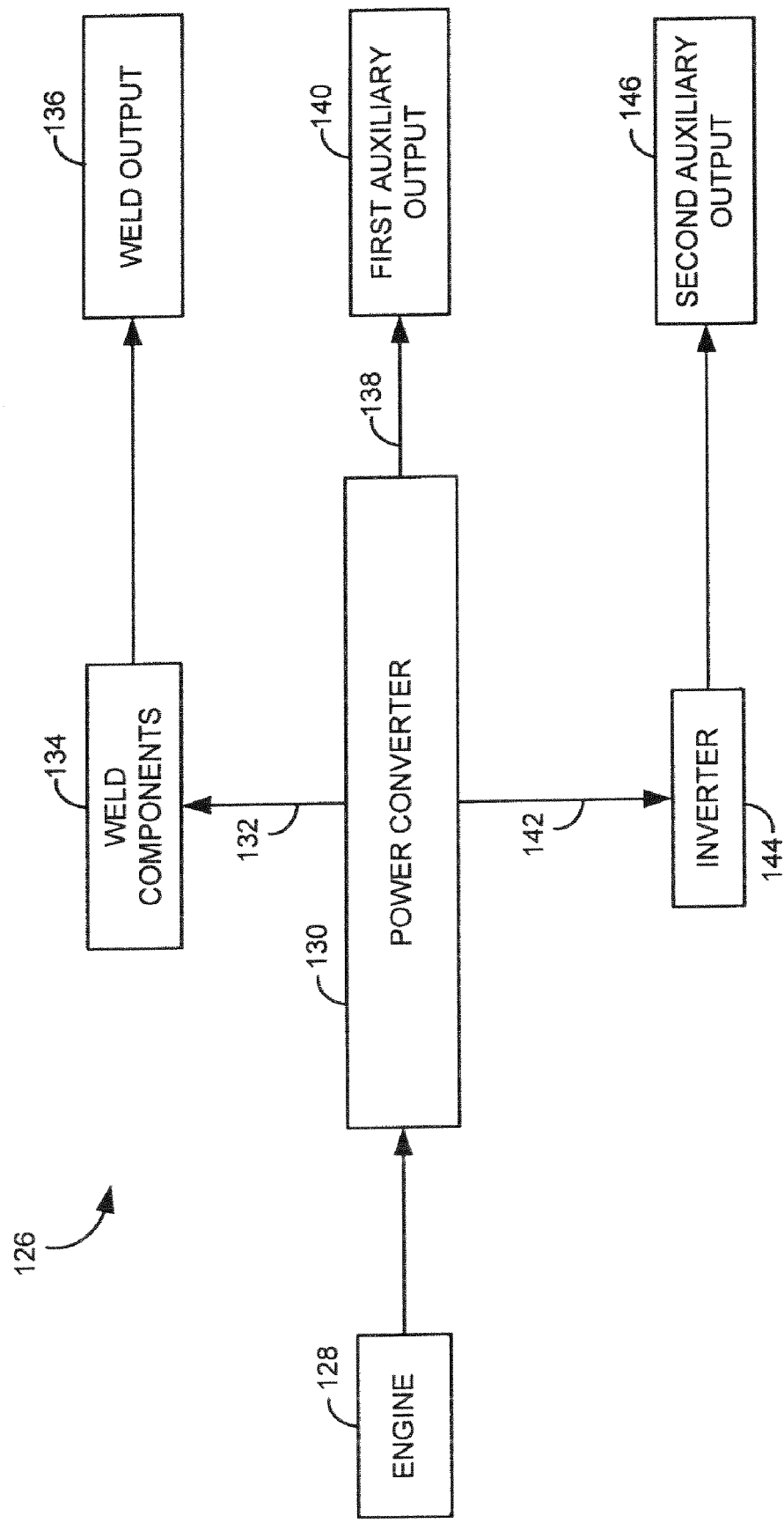
FIG. 3 is a block diagram of an alternate embodiment of the welder/generator device of FIG. 1.

An alternate embodiment of welding device 100 is shown in FIG. 3. As shown in FIG. 3, a welding device 126 has an engine 128 coupled to a power converter 130. Power converter 130 has a first output 132 electrically connected to a plurality of welding power conditioning components 134. Welding power conditioning components 134 generate a weld output 136 suitable for welding processes at elevated engine operating speeds. A second output 138 of power converter 130 is electrically connected to an optional first auxiliary output 140. First auxiliary output 140 is constructed to provide a relatively uniform AC or DC power to ancillary devices such as tools or lights at elevated engine operating speeds. A third output 142 from power converter 130 is electrically connected to a power conditioner 144, such as inverter DC. Power conditioner 144 is electrically coupled to a second auxiliary output 146 and is configured to deliver a relatively uniform 60 Hz AC power signal to the secondary output at all engine operating speeds.

Figure 4:
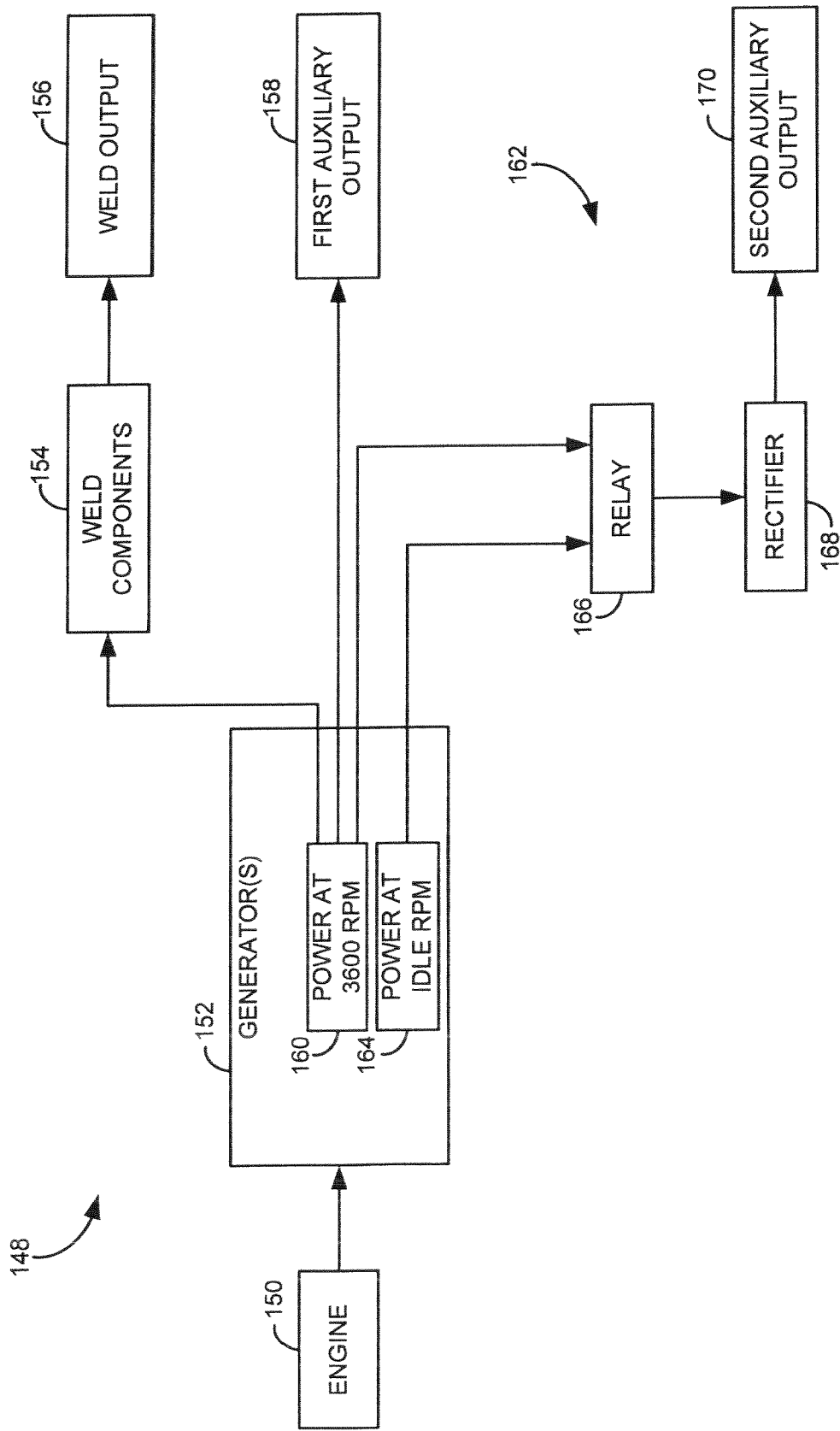
FIG. 4 is a block diagram of another alternate embodiment of the welder/generator device of FIG. 1.

Another embodiment of the present invention is shown in FIG. 4. A welding device 148 includes an engine 150 connected to a generator 152. Generator 152 includes a first output connected to a plurality of welding power conditioning components 154 configured to generate a power signal suitable for welding applications and deliver a weld power to a weld output 156. An optional first auxiliary output 158 is connected to generator 152 and is configured to provide a power signal suitable for powering auxiliary devices such as tools or lights at above idle engine operating speeds. It is understood that first auxiliary output 158 can be configured to deliver a relatively uniform AC or DC power as provided by generator 152. Generator 152 includes a first winding 160 configured to power the weld components 152, first auxiliary output 158, and a power conditioner 162 at elevated engine operating speeds. Generator 152 includes a second winding 164 configured to deliver power to power conditioner 162 at idle engine speeds. Power conditioner 162 includes a relay 166 connected to a rectifier 168. Relay 166 switches the source of power provided to rectifier 168 from generator 162 between first winding 160 and second winding 164 dependent on engine operating speed. Such a construction ensures rectifier 168 is provided with an adequate power signal from generator 152 at all engine speeds. Rectifier 168 provides a relatively uniform DC power signal to a second auxiliary output 170. Second auxiliary output 170 is electrically connectable to auxiliary devices such as hand tools, compressors, pumps, and lights and provides a source of auxiliary power independent of engine speed. As such, welding device 148 is capable of powering auxiliary devices at all engine operating speeds.

A welding-type device according to the present invention provides an auxiliary output having a relatively uniform power signal. The relatively uniform power signal is conditioned to provide operating power to AC or DC power requiring auxiliary devices at all engine speeds. It is understood that the embodiments disclosed herein could be combined into a single device constructed to provide both an AC and a DC relatively uniform power signal for powering both AC requiring auxiliary devices and DC requiring auxiliary devices thereby forming a highly versatile auxiliary device powering apparatus.

Therefore, the present invention includes an engine driven welder/generator having an engine driven welder-type device including an engine and a mechanical to electrical power converter connected to the engine and configured to generate a power signal suitable for welding processes. The device includes an accessory outlet housing a generally uniform power output from engine idle speed through high speed operation of the engine.

In another embodiment of the present invention, an engine driven welder/generator assembly includes an engine and a power converter connected to the engine. The power converted is configured to generate sufficient electrical power suitable for welding. The assembly includes a power conditioner configured to provide a generally uniform power signal independent of engine speed.

Another embodiment of the present invention includes a method of powering an accessory comprising the step of generating an electrical power signal from an engine driven welder/generator assembly. The method also comprises the steps of generating a weld power from the electrical power signal and generating a relatively uniform auxiliary power signal across variable engine speeds.

In an alternate embodiment of the present invention, a welding-type apparatus includes an engine constructed to generate mechanical power and means for converting the mechanical power to electrical power suitable for welding applications. The apparatus includes means for providing a relatively constant power signal independent of engine operating speed.

The present invention has been described in terms of the preferred embodiment, and it is recognized that equivalents, alternatives, and modifications, aside from those expressly stated, are possible and within the scope of the appending claims.

What is claimed is:

1. An engine driven welder-type device comprising:
   an engine;
   a mechanical to electrical power converter connected to the engine and configured to generate a power signal suitable for welding processes;
   an accessory outlet having a generally uniform power output from engine idle speed through high speed operation of the engine; and
   a battery electrically coupled to the accessory outlet.

2. The engine driven welder-type device of claim 1 further comprising an accessory connected to the accessory outlet, the accessory operable at all engine speeds.

3. The engine driven welder-type device of claim 2 wherein the accessory includes at least one of a light array, a saw, a grinder, and a drill.

4. The engine driven welder-type device of claim 3 wherein the light array further comprises at least one of a plurality of LEDs, a halogen light bulb, and a fluorescent light bulb.

5. The engine driven welder-type device of claim 1 wherein the generally uniform power output is one of a DC signal and an AC signal, the AC signal having a frequency of approximately 60 Hz.

6. The engine driven welder-type device of claim 1 further comprising at least one of a rectifier and an inverter connected between the power converter and the accessory outlet.

7. The engine driven welder-type device of claim 6 wherein the power converter further comprises a first winding configured to generate the power signal suitable for welding and a second winding configured to generate the accessory outlet generally uniform power output.

8. The engine driven welder-type device of claim 1 further comprising an alternator connected to the engine and the power converter.

9. The engine driven welder-type device of claim 1 further comprising a torch electrically connectable to the power converter.

10. An engine driven welder/generator assembly comprising:
    an engine;
    a power converter connected to the engine and configured to generate sufficient electrical power suitable for welding;
    a power conditioner configured to provide a generally uniform DC power signal independent of engine speed; and
    an outlet connected to the power conditioner and configured to supply the generally uniform DC power signal.

11. The engine driven welder/generator assembly of claim 10 wherein the power conditioner is at least one of a battery, an inverter, and a rectifier.

12. The engine driven welder/generator assembly of claim 11 wherein a battery is powered by at least one of an alternator attached to the engine and the power converter.

13. The engine driven welder/generator assembly of claim 10 wherein the power conditioner is powered by at least one of the engine and the power converter.

14. The engine driven welder/generator assembly of claim 10 further comprising a battery connected to start the engine and wherein the power converter further comprises a generator having a first winding configured to generate the electrical power suitable for welding and a second winding configured to maintain a charge on the battery.

15. The engine driven welder/generator assembly of claim 14 further comprising an accessory output powered by the first winding and wherein the outlet is powered by the second winding.

16. The engine driven welder/generator assembly of claim 10 wherein the generally uniform DC power signal has sufficient power output to operate at least one of a job site light, a saw, a drill, and a grinder.

17. A method of powering an accessory comprising the steps of:
  generating an electrical power signal from an engine driven welder/generator assembly;
  generating a weld power from the electrical power signal;
  charging a battery from the electrical power signal; and
  connecting the battery to output a relatively uniform auxiliary power signal across variable engine speeds.

18. The method of claim 17 further comprising the step of converting a first portion of the electrical power signal into a weld power and converting a second portion of the electrical power signal into the relatively uniform auxiliary power signal.

19. The method of claim 18 wherein the step of converting a second portion of the electrical power further comprises at least one of rectifying and inverting the electrical power signal.

20. The method of claim 17 wherein connecting the battery to output the relatively uniform power signal further comprises conditioning the relatively uniform power signal to deliver a relatively constant voltage.

21. The method of claim 17 further comprising generating another relatively uniform auxiliary power signal at weld power generating engine speeds.

22. The method of claim 21 further comprising delivering a second relatively uniform auxiliary power signal.

23. The method of claim 17 further comprising powering an auxiliary device with the relatively uniform auxiliary power signal.

24. The method of claim 17 further comprising illuminating a worksite with the relatively uniform auxiliary power signal independent of engine speed.

25. A welding-type apparatus comprising:
  an engine constructed to generate mechanical power;
  means for converting the mechanical power to electrical power suitable for welding applications;
  means for providing a relatively constant power signal independent of engine operating speed; and
  means for storing energy generated by the engine and powering the constant power signal means.

26. The welding-type apparatus of claim 25 wherein the converting means further comprises means for generating electrical power suitable for powering accessories during above idle engine operating speeds.

27. The welding-type apparatus of claim 25 further comprising means for illuminating a work area powered by the relatively constant power signal means.

28. The apparatus of claim 25 wherein the means for illuminating a work area is at least one of a plurality of light emitting diodes, a fluorescent light, and a halogen light.

* * * * *